Figure 1:
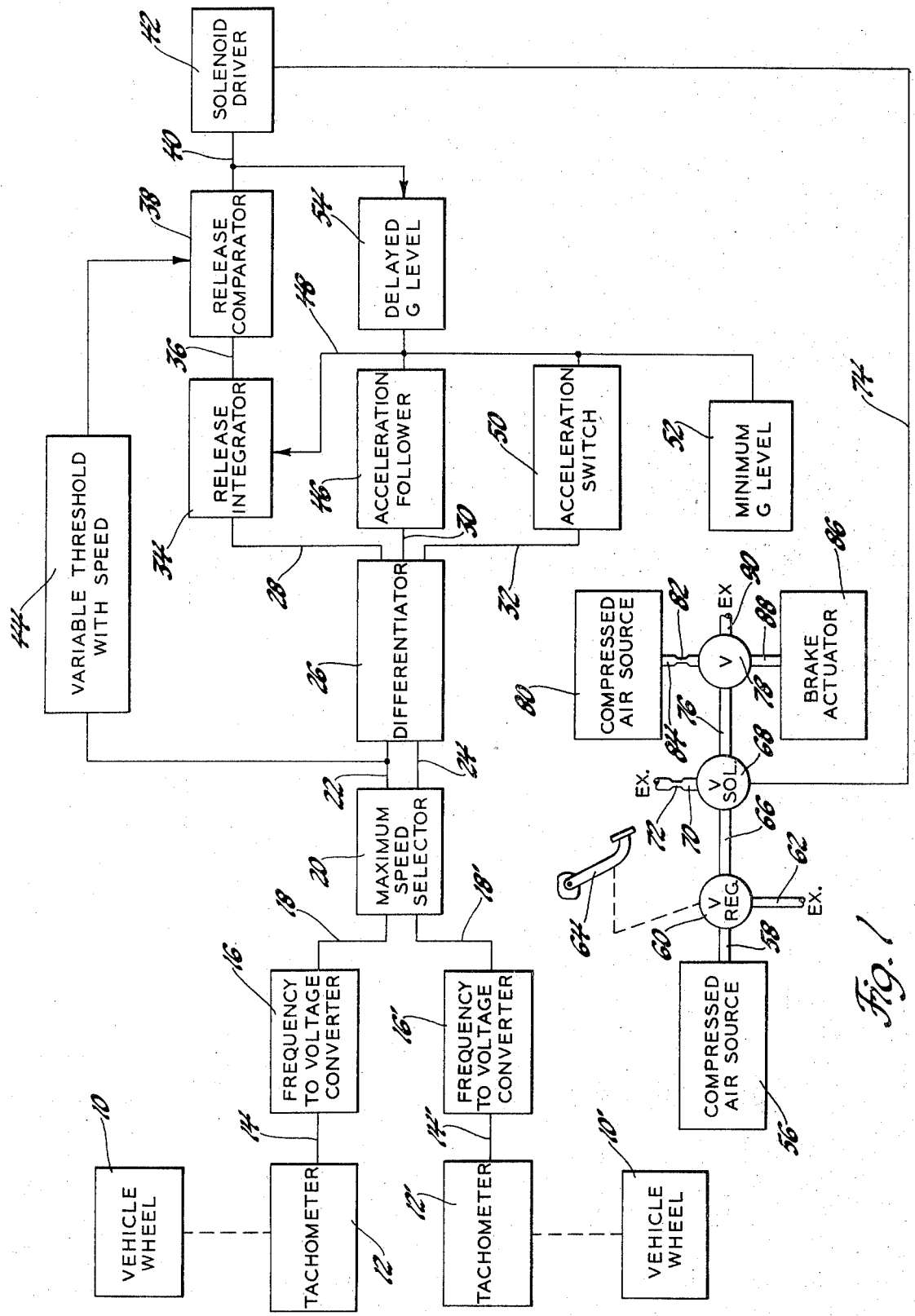

United States Patent [19]

Wind

[11] 3,838,890
[45] Oct. 1, 1974

[54] ADAPTIVE ANTI-LOCK BRAKE CONTROL

[75] Inventor: Robert H. Wind, Grand Blanc, Mich.

[73] Assignee: General Motors Corporation, Detroit, Mich.

[22] Filed: Mar. 19, 1973

[21] Appl. No.: 342,858

[52] U.S. Cl. .......................... 303/21 BE, 188/181 A
[51] Int. Cl. ................................................ B60t 8.12
[58] Field of Search ............ 188/181 A; 303/20, 21; 317/5; 324/162; 340/53, 262

[56] References Cited
UNITED STATES PATENTS

| | | | |
|---|---|---|---|
| 3,523,712 | 8/1970 | Leiber ............................ | 303/21 CG |
| 3,604,761 | 9/1971 | Okamoto et al. ............ | 303/21 BE X |
| 3,614,174 | 10/1971 | Romero .......................... | 303/21 CG |
| 3,677,609 | 7/1972 | Davis et al. ...................... | 303/21 PX |
| 3,709,567 | 1/1973 | Van Ostrom et al. .......... | 303/21 BE |
| 3,716,273 | 2/1973 | Beyerlein ........................ | 303/21 CG |
| 3,717,384 | 2/1973 | Harned ........................... | 303/21 BE |

Primary Examiner—Trygve M. Blix
Assistant Examiner—Stephen G. Kunin
Attorney, Agent, or Firm—Warren D. Hill

[57] ABSTRACT

An anti-lock brake control especially suited to heavy duty trucks with air brakes senses the wheel speed on a given axle and cyclicly releases and applies the brakes on that axle as required to avoid undesirable wheel slip during braking. The control differentiates the speed signal of the fastest wheel, compares the resulting deceleration signal to a reference signal and integrates the difference to arrive at a velocity error signal indicating the amount of wheel slip. A comparator compares the velocity error signal to a threshold signal which varies with wheel speed to produce a brake release signal when the threshold is exceeded so that the system is made less sensitive at high wheel speeds than at low speeds. The reference signal is derived from several sources: a minimum g level circuit which always provides a small reference signal, a delayed g level circuit which initially provides the major portion of the reference signal prior to the first release and subsequently gradually supplies a portion of the reference signal a delayed time after brake reapply, an acceleration amplifier which supplies a signal proportional to positive wheel acceleration in each cycle and partially sustains that value for the succeeding brake release, and an acceleration switch which provides an increase of the reference signal when the positive acceleration exceeds a predetermined value.

4 Claims, 4 Drawing Figures

ADAPTIVE ANTI-LOCK BRAKE CONTROL

This invention relates to an anti-lock control for vehicle brakes and particularly to such a control which is adaptive to various road conditions.

It has previously been proposed in anti-lock brake controls to prevent or minimize wheel lock-up by sensing incipient lock-up and then releasing brake pressure until the wheel recovers in speed and then reapplying the brake pressure and repeating the cycle as often as necessary. There have been various proposals for detecting incipient wheel lock-up which involve comparing the deceleration of a braked wheel to either a fixed or a variable reference deceleration and to effect braking as a function of some relationship between the actual and reference decelerations. These proposals were designed for automobiles and were in practice applied to them with varying degrees of success. They are not, however, in general, applicable to heavy duty tracks particularly those with air brake systems since the brake characteristics of trucks inherently vary greatly according to the loading of the truck and the air brake system responds slowly to requested changes in brake pressure as compared to the hydraulic brakes of automobiles.

It is therefore a general object of this invention to provide an anti-lock brake control suitable for heavy trucks which accomodates not only variations in road conditions but also variable loading.

Another object is to provide an anti-lock brake control which senses the road coefficient of friction and vehicle loading by sensing the positive wheel acceleration during brake release.

It is a further object of this invention to provide an anti-lock brake control utilizing the positive wheel acceleration in one cycle as a measure, in part, of vehicle deceleration in a succeeding cycle.

The invention is carried out by providing a control for an anti-lock brake system having apparatus for sensing wheel speed and determining wheel acceleration, a circuit for comparing a deceleration signal with a reference signal and integrating the difference, and a circuit for comparing the integrated signal with a threshold and producing a brake release or brake reapply signal as a function of the relative values of the integrated signal and the threshold wherein the reference signal is a continuous function of positive wheel acceleration. The invention further contemplates that the threshold signal vary with wheel speed to render the control less sensitive at high speeds and that a circuit is provided for gradually applying another component of the reference signal at a delayed time after a brake reapplication.

Figure 2A:
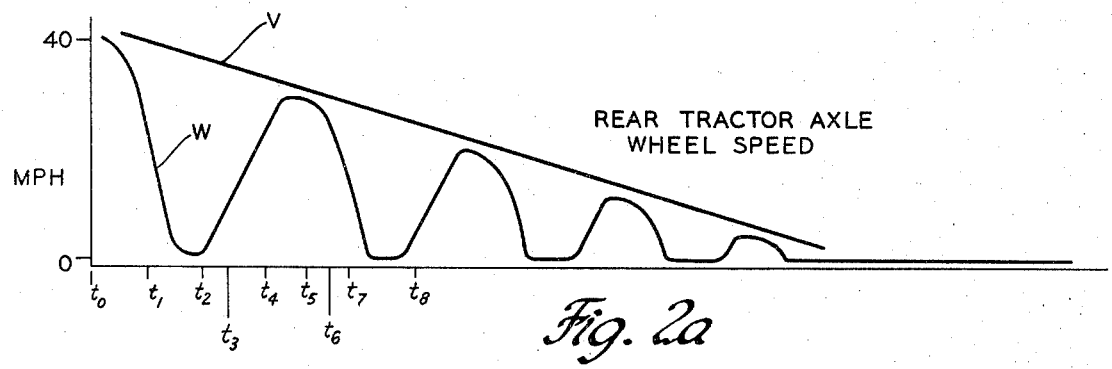
Figure 2B:
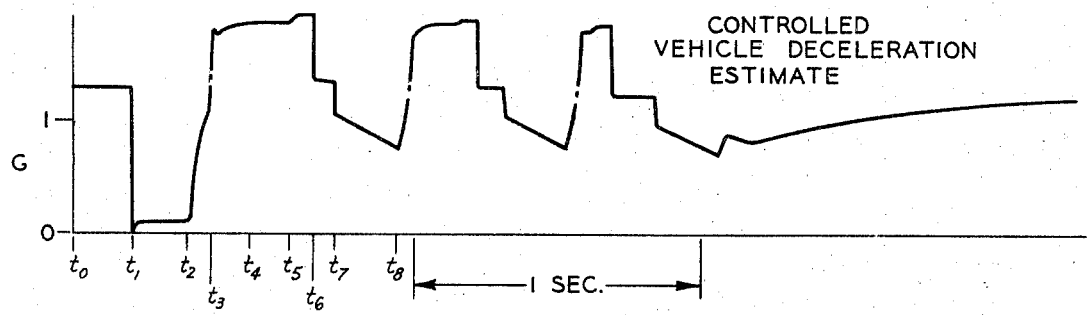
Figure 3A:
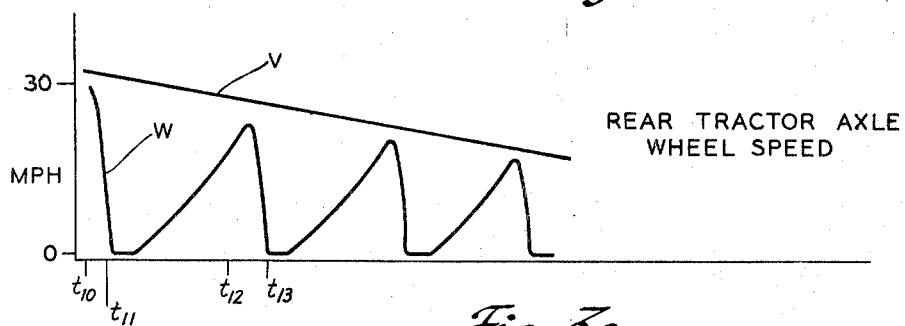
Figure 3B:
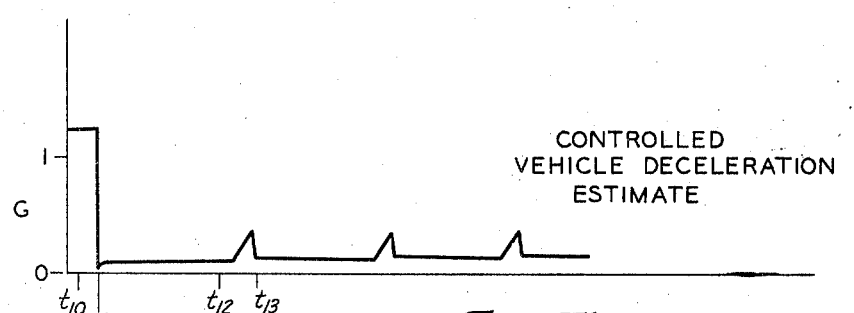
Figure 4:
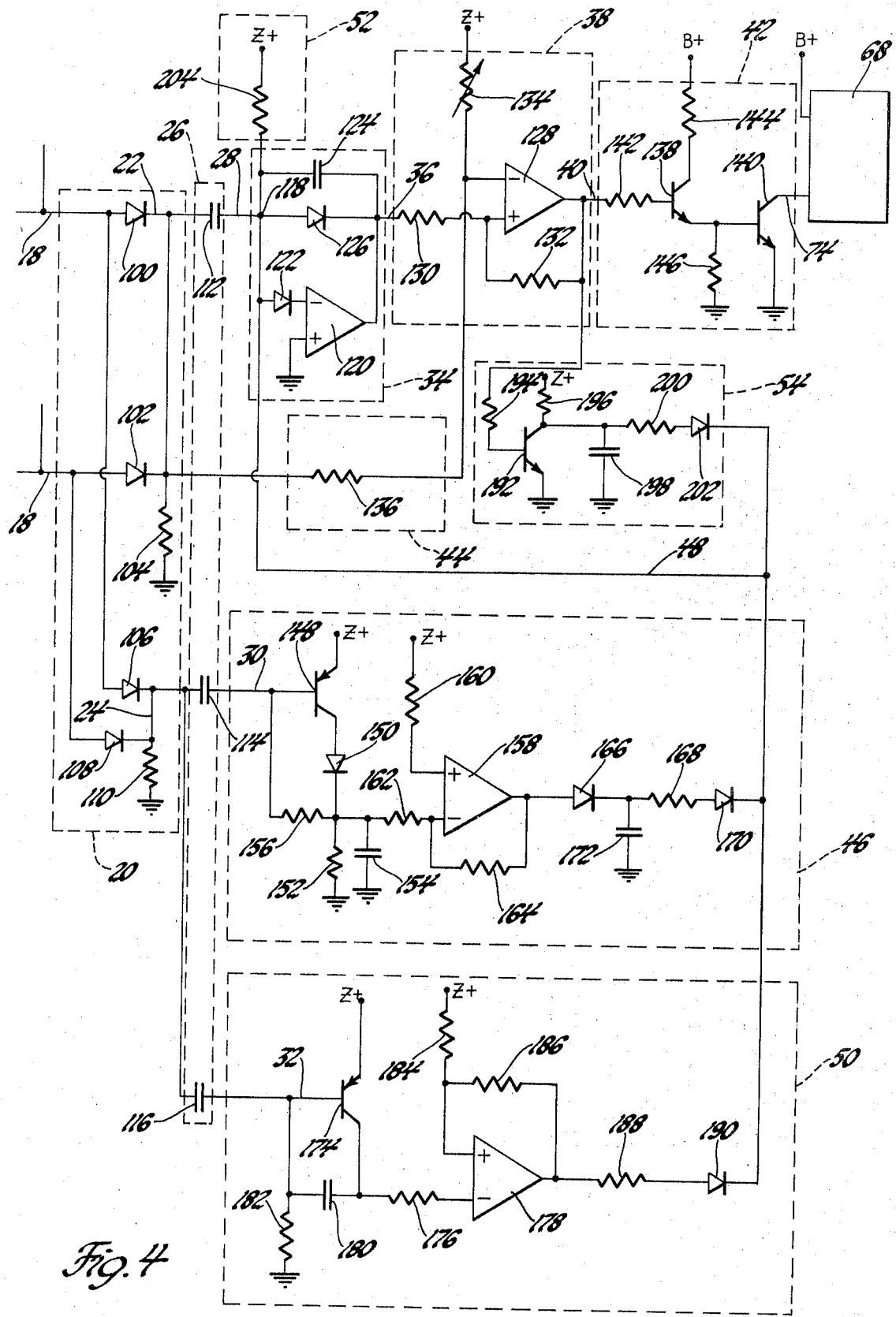

The above and other advantages will be made more apparent from the following specification taken in conjunction with the accompanying drawings wherein like reference numerals refer to like parts and wherein:

FIG. 1 is a block diagram of an anti-lock brake control according to the invention in conjunction with a schematic drawing of an air brake system, FIG. 2a is a graphical illustration of wheel speed during anti-lock cycling, FIG. 2b is a graphical illustration of the deceleration reference signal related to FIG. 3a, FIGS. 3a and 3b are similar to FIGs. 2a and 2b under different vehicle operating conditions, and FIG. 4 is a schematic electrical diagram of a portion of the anti-lock brake control of FIG. 1.

While this invention is considered to be of general application to wheeled vehicles, it is disclosed herein as applied to heavy trucks with air brakes. In such vehicles it is contemplated that each axle will be controlled independently of the others both on the tractors and on the trailors such that each axle will be furnished with a complete anti-lock brake control system, the brakes having in common only the manually controlled air pressure which is supplied at the will of the vehicle operator.

A system for which this invention is utilized follows the well established principle of sensing incipient wheel lock-up when brake pressure is applied to vehicle brakes, then releasing the brake pressure until the wheel accelerates to a speed near that which is normal for a braked wheel and then reapplying the pressure. This cycle is repeated as necessary to achieve the desired braking action. The system further employs an improved version of the inertia wheel velocity reference principle which is fully set forth in the U.S. patent to Harned U.S. Pat. No. 3,554,612. That principle involves measuring the velocity of the braked wheel and subtracting therefrom a simulated vehicle velocity and utilizing the difference as a criterion of when the wheel brakes should be released and reapplied for most effective control. In practice, this principle has been applied by comparing the wheel deceleration with a vehicle deceleration estimate and integrating the difference to obtain a signal representing the amount when the vehicle speed estimate exceeds the wheel speed or velocity error. This velocity error is then compared to a threshold value by a comparator circuit which issues a brake release signal when the velocity error exceeds the threshold and a reapply signal when the velocity error signal error drops below the threshold. According to the present invention, the estimated vehicle deceleration is determined in a manner which makes allowance for the coefficient of friction of a surface on which the wheel is travelling as well as the loading on the wheel. In addition, the comparator threshold is varied according to wheel speed to adjust system sensitivity.

As shown in FIG. 1, vehicle wheels 10 and 10' are connected with tachometers 12 and 12' respectively for sensing the wheel speeds. The tachometers are preferably toothed wheel variable reluctance, electromagnetic transducers providing a signal having a frequency proportional to wheel speed on lines 14 and 14' which are connected to frequency to voltage converters 16 and 16'. The converter 16 and 16' provide on lines 18 and 18' electrical analogue signals proportional to wheel speed. The analogue signals are fed to a maximum speed selector 20 which transmits to lines 22 and 24 that analogue signal representing the highest wheel speed. Alternatively, for some applications an average or the minimum wheel speed can advantageously be used to provide the speed signal. A differentiator circuit 26 responsive to the wheel speed signals on lines 22 and 24 provides a plurality of outputs on lines 28, 30 and 32 each representing wheel acceleration. The term acceleration referred to herein refers to both positive acceleration and deceleration unless otherwise specified. The line 28 is connected to a release integrator 34 which has an output on line 36 connected to a release comparator 38. The output of the release comparator 38 is connected by line 40 to a solenoid driver 42. The wheel speed signal on line 22 is connected via a variable threshold with speed circuit 44 to the release comparator 38 to provide a variable threshold signal for the comparator.

Prior to brake release the comparator 38 has a built-in threshold corresponding to 4 mph which is changed to 2 mph upon brake release to provide hysteresis. The variable threshold circuit 44 adds a further threshold signal varying linearly with wheel speed and having a threshold value of 1 mph for 6 mph of wheel speed.

An acceleration follower circuit 46 senses the acceleration signal on line 30 and provides an output to line 48 leading to the release integrator 34 which is a function of the positive wheel acceleration occurring during each brake release cycle of anti-lock braking. The output of acceleration follower varies substantially linearly during increasing acceleration from zero at 1 g acceleration to a value representing 1.2 g at 3 g acceleration. The follower further senses the peak positive acceleration and produces a corresponding output which decays at a slow rate having a time constant of 0.55 seconds so that the signal level on line 48 is strongly influenced in each cycle (other than the first cycle) by the positive wheel acceleration in the previous cycle.

An acceleration switch 50 is sensitive to the acceleration signal on line 32 and contributes to the signal on line 48, a pulse having a value of 0.58 g which occurs when the positive wheel acceleration exceeds a predetermined value (2.3 g) during each brake release and terminates when the acceleration diminishes to a point below the predetermined value.

A minimum g level circuit 52 continuously supplies a small signal to line 48 which represents a value of about 0.1 g. A delayed g level circuit 54 has as its input the release comparator signal on line 40 and adds to the signal line 48 a contribution representing 1.16 g a delayed time after brake application. The time of delay is very short and the contribution is gradually applied with a time constant of 0.6 seconds after an apply signal is present on line 40. Thus normally prior to anti-lock brake operation, the full 1.16 g is contributed to line 48. The delayed g level signal however is terminated whenever a brake release signal is applied to line 40. Thus after the initial release in anti-lock braking operation, the contribution of the delayed g level circuit is periodic, occurring after reapplying signals and is of low value. The several signals supplied to line 48 are additive and their sum is the estimated vehicle deceleration which is defined as the reference deceleration in the release integrator 34.

In some applications the control operation can be improved by departing from the estimated vehicle deceleration as the reference. Specifically it may be beneficial to reapply the brakes when the wheel acceleration reaches a certain threshold. Thus the acceleration switch 50 may be designed to provide a pulse on line 48 about two orders of magnitude greater than that specified above to rapidly force the output of the release integrator to a low value for effecting brake reapplication.

The air brake system regulated by the subject control comprises a compressed air source 56 connected by a conduit 58 to a proportional pressure regulator valve 60 having an exhaust port 62 and which is manually controlled by a brake pedal 64. A further conduit 66 connects the valve 60 to a solenoid valve 68 having a port 70 which exhausts through a restricting orifice 72.

The solenoid valve is electrically actuated by a signal on line 74 carrying the output signal from a solenoid drive 42. A conduit 76 connects the solenoid valve 68 to a relay valve 78 which is connected to a compressed air source 80 through a restricting orifice 82 and conduit 84 and is further connected to a brake actuator 86 by conduit 88. The relay valve further includes an exhaust port 90. The air brake system is conventional except for the solenoid valve 68 and the restricting orifices. During normal brake operation the actuation of the valve 60 by the pedal 64 produces a pilot pressure within the conduit 66 as a function of pedal position and that pilot pressure is transmitted through the valve 68 to the conventional relay valve 78. Upon brake application, compressed air is metered through the valve 78 from the source 80 to the brake actuator 86 at a flow rate limited by the restricting orifice 82 until the actuator pressure closely approaches the pilot pressure. During brake release air flow is metered by the relay valve 78 from the brake actuator to the exhaust port 90 at a pressure rate determined by the pilot pressure rate which is limited by the restricting orifice 72. Whenever during brake application the anti-lock control circuit detects an incipient wheel lock condition, a brake release signal on line 74 will actuate the solenoid valve 78 which then isolates the conduit 66 from the conduit 76 and connects the conduit 76 to exhaust through the orifice 72 so that the pilot pressure applied to the relay valve is decreased at a rate determined by the orifice 72 causing the brake actuator to be relieved of pressure according to the decreasing pilot pressure in conduit 76. When the anti-lock brake control circuit requests a brake reapplication, the solenoid valve 68 is returned to normal position so that the operator controlled pilot pressure is again applied to the relay valve 78 and the brake actuator is re-energized at a rate limited primarily by the orifice 82. The orifice 82 thus inhibits sudden brake reapplication.

In operation of the circuit the release integrator 34 compares the wheel deceleration signal on line 28 with the deceleration reference signal on line 48 and integrates the difference. The output on line 36 then represents the velocity error or the amount by which the vehicle speed estimate exceeds the actual wheel speed. The velocity error signal on line 36 is compared to the variable threshold from the circuit 44 by the release comparator 38 such that when the velocity error exceeds the threshold, a brake release signal is applied via line 40 to the solenoid driver 42. The brake release effected at the request of the solenoid driver then allows the vehicle wheels to recover in speed until the velocity error signal on line 36 becomes smaller than the variable threshold and brake application is requested by the release comparator and the solenoid driver.

The operation of the anti-lock control is further explained with reference to FIGS. 2a and 2b. FIG. 2a depicts vehicle speed V and wheel speed W for a typical anti-lock operation on pavement resembling dry asphalt for an unloaded tractor. FIG. 2b is correlated with FIG. 2a and depicts the deceleration reference signal on line 48. At time $t_0$ brakes are manually applied so that vehicle speed and wheel speed begin to decrease. The deceleration reference signal at that point is at 1.26 g and is made up of signals of 0.1 g from the minimum g level circuit 52 and 1.16 g from the delayed g level circuit 54. The latter signal is at its maximum value since the brake controller has been in an apply mode for a long time prior to $t_0$. Between the times $t_0$ and $t_1$ the differentiator 26 produces on line 28 a signal representing the deceleration of the fastest wheel and that value is compared in the release integrator 34 with the deceleration reference signal of 1.26 g. The difference of the two signals is integrated to produce a velocity error which is compared by the release comparator 38 to the variable threshold signal from circuit 44. At the time $t_0$ the wheel speed was 40 mph, and the threshold was 10.6 mph since the value of the threshold is 4 mph plus 1/6 of maximum wheel speed. By time $t_1$ the wheel speed decreased to 22 mph so that the variable threshold dropped to 7.6 mph. Thus as wheel speed decreases, the release comparator becomes more sensitive to velocity error. At $t_1$ the velocity error has reached the value of 7.6 mph and the release comparator 38 calls for a brake release. The brake release signal is detected by the delayed g level circuit 54 to terminate the delayed g level signal so that after time $t_1$ the deceleration reference signal is 0.1 g fixed by the minimum g level circuit 52. As the brake release is gradually carried out in the air brake system, the wheel speed begins to recover and by time $t_2$ the acceleration follower circuit 46 detects a positive wheel acceleration exceeding 1 g and produces a signal contributing to the deceleration reference level on line 48 in a manner proportionate to wheel acceleration. By time $t_3$ the wheel acceleration has reached 2.3 g causing the acceleration switch 50 to contribute a further signal representing 0.5 g to the deceleration reference on line 48. Thereafter the deceleration reference remains about the same for a substantial period. The integrator has continued to operate and at time $t_4$ the velocity error becomes smaller than the variable threshold so that the release comparator switches to request a brake reapplication. At $t_5$ which occurs at some time delay after $t_4$, the delayed g level circuit is again energized and gradually contributes a signal to the deceleration reference signal. At time $t_6$ the acceleration switch turns off to cause a step decrease in the deceleration reference and at time $t_7$ the velocity error has again surpassed the variable threshold so that the release comparator requests a release, thus terminating the delayed g level signal to effect another step decrease in the deceleration reference. Since the acceleration follower circuit senses the maximum wheel acceleration occurring at about time $t_4$ and slowly decays thereafter with a time constant of 0.55 seconds, this contribution to the deceleration reference has been diminishing since time about $t_4$. During the period following time $t_6$, the deceleration reference signal has been determined chiefly by the acceleration follower signal. After time $t_7$ the deceleration reference is determined solely by the acceleration follower signal and the minimum g level signal which is insignificant. At time $t_8$ the acceleration follower senses wheel acceleration again to again increase the deceleration reference. From that point on the deceleration reference signal follows much the same pattern with its specific value determined by the wheel speed and acceleration characteristics. It is noted that for a brief portion of the time between $t_7$ and $t_8$, the wheel speed drops to zero but quickly recovers due to the action of the anti-lock brake control.

Since the release integrator is continuously integrating the difference between the wheel acceleration and the deceleration reference signal, it is the average value of the deceleration reference signal which is for the most part effective to determine the release and apply times of the brake although the apply times are greatly affected by the wheel acceleration. After the first brake release, it is the acceleration follower output which primarily determines the average level of the deceleration reference signal. Thus as will be apparent from an observation of FIG. 2b, the average deceleration reference level is somewhat in excess of 1 g which is appropriate for dry asphalt. For surfaces with a lower coefficient of friction, the control generally operates in the same manner, but since the positive wheel acceleration is lower the acceleration follower output is lower resulting in a value of average deceleration reference which decreases as the coefficient of friction decreases assuming a constant load. An increased load causes increased positive wheel acceleration resulting in a higher average deceleration reference signal.

An extreme example of the control operation is shown in FIGS. 3a and 3b where the road surface is ice and the vehicle is an unloaded tractor. At time $t_{10}$ the brakes are applied causing vehicle speed V and wheel speed W to decrease. The wheel speed drops very rapidly due to the slippery surface and the velocity error quickly becomes large so that the release comparator 38 requests a brake release at $t_{11}$. At $t_{11}$ the delayed g level signal terminates and deceleration reference signal drops from its initial level of 1.26 g to 0.1 g as determined by the minimum g level circuit 52. As wheel speed recovers upon brake release, the velocity error decreases so that the release comparator effects brake reapplication at about time $t_{12}$. Shortly thereafter the delayed g level circuit gradually contributes an increase in the deceleration reference level which continues until the next brake release request at $t_{13}$. Thus on ice the wheel acceleration is so low that the acceleration follower and acceleration switch are not brought into play and the minimum g level circuit is the primary source of the deceleration reference signal. Thus the average deceleration reference signal is very low reflecting the low coefficient of friction and the low load. In each case (FIGS. 2a and 3a) as a wheel speed drops, the time interval of the anti-lock brake cycles becomes shorter reflecting the increased sensitivity of the system caused by the variable threshold circuit 44.

A specific example of the control circuit according to the invention is set forth in FIG. 4. A power supply, not shown, comprises a vehicle battery having a voltage B+ of nominally 12 volts, and a regulated power source Z+ of 8.2 volts. Since the tachometers 12, 12' and the frequency to voltage converters 16, 16' are well known devices they are not shown in detail. The lines 18 and 18' providing wheel speed signals to the input of the maximum speed selector 20 are each connected through a diode 100 and 102 respectively to line 22 (which is connected to ground through a resistor 104) so that the higher of the two voltages appearing on lines 18 and 18' will control the voltage on line 22. Similarly the lines 18 and 18' are connected through diodes 106 and 108 respectively which lead to line 24 which is grounded through a resistor 110 such that line 24 similarly reflects the highest of the two wheel speed signals. The two diode selector sections provide isolation of line 22 from the line 24. The differentiator 26 includes a capacitor 112 connected to the line 22 and capacitors 114 and 116 connected to line 24 to produce acceleration output signals on line 28, 30 and 32 respectively.

The release integrator 34 has as its inputs the current signals from lines 28 and 48 which are summed at a junction point 118. The release integrator includes an operational amplifier 120. This operational amplifier as well as the others in the control is the Norton type (e.g. Motorola MC 3301P) which has substantially constant input voltages at about ½ volt and which operates on the basis of the differential current at the inputs. The positive input of amplifier 120 is connected to ground and the negative input is connected through the diode 122 to the junction 118. A feedback capacitor 124 and a diode 126 are connected between the junction point 118 and the amplifier output on line 36. The capacitor 124 of course provides the integrating function of the circuit while the diode 126 limits negative excursions of the amplifier output. The junction point 118 is clamped at a maximum of about 1 volt above ground due to the voltage drop across the diode 122 and the substantially constant input voltage of the operational amplifier. During wheel deceleration the capacitor 112 draws current from the junction 118 and when it exceeds that supplied by line 48 the voltage at the junction point 118 has a tendency to drop so that the output voltage of the amplifier increases. When the wheel deceleration is great enough to cause the amplifier to saturate, the junction point 118 will decrease in voltage according to the degree of discharge of the capacitor 112. By virtue of the diode 122, this decrease serves as a memory function so that a corresponding wheel acceleration must occur to restore the junction point to its nominal clamped voltage and the amplifier will then operate again in its linear range.

The voltage on line 36 representing velocity error is fed to the release comparator 38 which comprises an operational amplifier 128 having its positive input connected through a resistor 130 to the line 36 and having a feedback resistor 132 between its output and its positive input. The negative input of the amplifier 128 is connected through a resistor 134 to Z+, the resistor 134 is selected to provide a threshold value of 4 mph representing the minimum threshold. The negative input of the amplifier 128 is also connected to the variable threshold circuit 44 which comprises a resistor 136 connected to the line 22 carrying the wheel speed information. Thus current through the resistor 136 is added to the current through the resistor 134 to provide a variable threshold according to wheel speed such that the threshold increases by an amount representing 1 mph for every 6 mph increase of wheel speed. The feedback resistor 132 provides hysteresis such that when the release comparator produces a positive output representing a release request signal, the effective threshold is reduced by 2 mph thereby assuring positive switching action when the comparator changes states. The solenoid driver 42 is a two-stage amplifier comprising transistors 138 and 140. Transistor 138 has its base connected through a resistor 142 to line 40 and its collector connected to B+ through a resistor 144. The emitter of the transistor 138 is connected to ground through a resistor 146 and is also connected to the base of the transistor 140. The transistor 140 has a grounded emitter and its collector is connected to the solenoid valve 68 via line 74. The solenoid valve is further connected to B+ so that when a positive release signal is applied to line 40, the transistor 138 and 140 conduct allowing energizing current to flow through the solenoid valve 68. Similarly when the positive release signal is removed from the line 40, the transistors are rendered nonconducting and the energizing current is switched off.

The acceleration follower circuit 46 is connected to line 30 carrying a wheel acceleration signal and comprising a two-stage amplifier and a peak follower circuit. The first-stage amplifier is an inverter comprising a transistor 148 having its base connected to line 30 and its emitter connected to Z+. The collector of that transistor is connected through a diode 150 to a filter comprising a resistor 152 and a capacitor 154 connected in parallel to ground. A feedback resistor 156 is connected between the transistor base and the cathode of the diode 150. The second amplifier stage is also an inverter comprising an operational amplifier 158 having its positive input connected through a resistor 160 to Z+ and its negative input connected through an input resistor 162 to the cathode of the diode 150. A feedback resistor 164 is connected between the negative input and the output of the operational amplifier 158. The peak follower circuit includes a diode 166, a resistor 168 and a diode 170 connected in series between the output of the amplifier 158 and the line 48. The cathode of the diode 166 is connected through a capacitor 172 to ground. In operation the positive wheel acceleration appearing on line 30 is filtered and substantially proportionately amplified to charge the capacitor 172 according to the value of the acceleration but reduced by the amount of the voltage drop across the diode 166. When the voltage across the capacitor 172 exceeds the forward voltage drop of the diode 170 and the voltage of the junction point 118 which will occur at an acceleration of 1 g, the diode 170 will conduct to contribute current to the deceleration reference signal on line 48, the amount of the contribution of course being proportionate to the capacitor voltage. The current supplied to the line 48 will increase as the wheel acceleration increases. When wheel acceleration reaches a peak and then diminishes, the capacitor 172 will discharge at a rate determined by the capacitor 172 and the resistor 168. Preferably those components are selected to provide a time constant at 0.55 seconds. Accordingly the amplifier follower output decreases gradually after the positive acceleration peak.

The acceleration switch 50 is connected to the differentiating capacitor 116 by line 32. The switch includes a transistor 174 having its emitter connected to Z+ and its base connected to the line 32. The collector is connected through a resistor 176 to the negative input of an operational amplifier 178. A capacitor 180 is connected across the base and collector of transistor 174 and with the resistor 176 acts as a filter of AC ripple. A resistor 182 connected between the base of the transistor and ground acting with the capacitor 116 establishes the acceleration required for switching the transistor 174. The operational amplifier 178 has its positive input connected through a resistor 184 to Z+ and through a feedback resistor 186 to the amplifier output. The feedback resistor provides hysteresis for ripple rejection which is effective particularly at low speeds. The output of the amplifier 178 is connected through a resistor 188 and a diode 190 to line 48. Normally the transistor 174 is conducting to drive the output of amplifier 178 negative. When the wheel acceleration operates at a predetermined value, preferably 2.3 g, the transistor 174 cuts off allowing the amplifier 178 to switch to a positive output thereby supplying a contributory signal to the deceleration reference lines 48.

The delayed g level circuit 54 comprises a transistor 192 having its base connected through a resistor 194 to the line 40, a grounded emitter and a collector connected through a resistor 196 through Z+. The transistor collector is further connected through a capacitor 198 to ground and through a resistor 200 and a diode 202 to line 48. In the brake apply mode, the voltage on line 40 is low so that the transistor 192 is cut off and the capacitor 198 is fully charged. Then current representing 1.16 g of deceleration is applied to the line 48 through the diode 202. When however a positive release signal is presented to line 40, the transistor 192 conducts to discharge the capacitor 198 almost immediately so that the diode 202 becomes backbiased and no current flows therethrough. When however the brake reapplication is requested, the voltage line 40 becomes low, the transistor 192 will cut off causing the capacitor 198 to slowly charge through the resistor 196 with a time constant of 0.6 seconds. Due to the forward voltage drop of the diode 202 and the nominal one volt potential of the junction point 118, current does not immediately flow through the diode 202. However, after a time delay required for the capacitor 198 to receive a sufficient charge, current will flow through the diode 202 to line 48 in a gradually increasing exponential manner. A minimum g level is applied to the line 48 by the minimum g level circuit 52 which comprises a resistor 204 connected between Z+ and the line 48.

It will thus be seen that the several sources of the deceleration reference signal combine to provide a reference signal which is a function of positive wheel acceleration and therefore a function of coefficient of friction and vehicle loading and further to provide a minimum reference signal as well as a substantial signal at a delayed time after brake application. It will further be seen that by reason of the variable threshold with speed, the control is relatively insensitive to wheel speed changes at high speeds but becomes more sensitive at low speeds.

The embodiment of the invention described herein is for purposes of illustration and the scope of the invention is intended to be limited only by the following claims:

It is claimed:

1. A control for an anti-lock brake system for a vehicle with braked wheels comprising:
means providing a speed signal which represents wheel speed,
differentiator means responsive to the speed signal for producing at least one acceleration signal representing wheel acceleration,
means for producing a deceleration reference signal representing a rough estimate of vehicle deceleration,
integrator means responsive to the acceleration signal and the deceleration reference signal for producing a velocity error signal representing the difference between wheel speed and an estimated vehicle speed,
and means responsive to the velocity error signal for producing an output signal requesting brake release when the velocity error signal exceeds a determined threshold value and requesting a brake reapply when the velocity error signal drops below a second lower threshold value,
the means for providing a deceleration reference signal including means connected to the differentiator means responsive to the maximum positive wheel acceleration signal during each cycle for providing a continuously variable vehicle deceleration estimate signal comprising a portion of the reference signal for each succeeding cycle.

2. A control for an anti-lock brake system for a vehicle with braked wheels comprising:
means providing a speed signal which represents wheel speed,
differentiator means responsive to the speed signal for producing at least one acceleration signal representing wheel acceleration,
means for producing a deceleration reference signal representing a rough estimate of vehicle deceleration,
integrator means responsive to the acceleration signal and the deceleration reference signal for producing a velocity error signal representing the difference between wheel speed and an estimated vehicle speed,
and means responsive to the velocity error signal for producing an output signal requesting brake release when the velocity error signal exceeds a determined threshold value and requesting a brake reapply when the velocity error signal drops below a second lower threshold value,
the means for providing a deceleration reference signal including an electronic circuit connected to the differentiator means responsive to an acceleration signal for providing a further signal proportional, within limits, to positive wheel acceleration, and a peak follower circuit responsive to said further signal for providing a portion of the deceleration reference signal which varies as a function of vehicle deceleration.

3. A control for an anti-lock brake system for a vehicle with braked wheels comprising:
means providing a speed signal which represents wheel speed,
differentiator means responsive to the speed signal for producing at least one acceleration signal representing wheel acceleration,
means for producing a deceleration reference signal representing a rough estimate of vehicle deceleration,
integrator means responsive to the acceleration signal and the deceleration reference signal for producing a velocity error signal representing the difference between wheel speed and an estimated vehicle speed,
and means responsive to the velocity error signal for producing an output signal requesting brake release when the velocity error signal exceeds a determined threshold value and requesting a brake reapply when the velocity error signal drops below a second lower threshold valve,
the means for providing a deceleration reference signal including means connected to the differentiator means and responsive to positive wheel acceleration as indicated by an acceleration signal for providing a continuously variable vehicle deceleration estimate signal that contributes to the deceleration reference signal,
the means for producing an output signal including means responsive to the speed signal for changing the determined threshold value substantially proportional to change in the speed signal whereby the control becomes less sensitive to wheel speed changes at high wheel speeds than at low wheel speeds.

4. A control for an anti-lock brake system for a vehicle with braked wheels comprising:

means providing a speed signal which represents wheel speed, differentiator means responsive to the speed signal for producing at least one acceleration signal representing wheel acceleration, means for producing a deceleration reference signal representing a rough estimate of vehicle deceleration, integrator means responsive to the acceleration signal and the deceleration reference signal for producing a velocity error signal representing the difference between wheel speed and an estimated vehicle speed, and means responsive to the velocity error signal for producing an output signal requesting brake release when the velocity error signal exceeds a determined threshold value and requesting a brake reapply when the velocity error signal drops below a second lower threshold value, the means for providing a deceleration reference signal including means connected to the differentiator means and responsive to positive wheel acceleration as indicated by an acceleration signal for providing a vehicle deceleration estimate signal that contributes to the deceleration reference signal and further including a circuit responsive to the output signal for providing a signal gradually increasing toward a maximum value and contributing to the deceleration reference signal after the output signal requests a brake reapply and terminating when the output signal requests a brake release.

* * * * *

PO-1050
(5/69)

UNITED STATES PATENT OFFICE
CERTIFICATE OF CORRECTION

Patent No. 3,838,890            Dated October 1, 1974

Inventor(s) Robert H. Wind

It is certified that error appears in the above-identified patent and that said Letters Patent are hereby corrected as shown below:

Column 1, line 19 change "tracks" to --trucks--.

Column 2, line 31 change "when" to --which--.

Column 10, line 58 change "valve" to --value--.

Signed and sealed this 11th day of March 1975.

(SEAL)
Attest:

RUTH C. MASON
Attesting Officer

C. MARSHALL DANN
Commissioner of Patents
and Trademarks